United States Patent [19]

Sheldon et al.

[11] Patent Number: 5,536,385
[45] Date of Patent: Jul. 16, 1996

[54] PRODUCTION AND PURIFICATION OF CONTAMINATED EFFLUENT STREAMS CONTAINING AMMONIUM SULFATE AND AMMONIA

[75] Inventors: Joseph P. Sheldon, Houston; Walter H. Stanton, Tyler; Edward Malachosky, Coppell; Fred Applegath, Texas City, all of Tex.

[73] Assignee: Envirocorp Services & Technology, Inc., Houston, Tex.

[21] Appl. No.: 398,104

[22] Filed: Mar. 3, 1995

[51] Int. Cl.$^6$ ............................. B01D 61/44; C02F 1/469
[52] U.S. Cl. ......................... 204/523; 204/528; 205/748
[58] Field of Search ............................. 204/182.4, 182.5, 204/151

[56] References Cited

U.S. PATENT DOCUMENTS

| | | | |
|---|---|---|---|
| 2,970,953 | 2/1961 | Denig | 208/402 |
| 3,220,942 | 11/1965 | Crites | 204/147 |
| 3,359,200 | 12/1967 | Gitchel et al. | 210/63 |
| 3,606,999 | 9/1971 | Lawless | 210/761 |
| 3,853,759 | 12/1974 | Titmas | 210/761 |
| 3,920,419 | 11/1975 | Schroeder et al. | 55/70 |
| 3,974,258 | 8/1976 | Poitevin et al. | 423/242 |
| 4,093,544 | 6/1978 | Ross | 210/59 |
| 4,113,446 | 9/1978 | Modell et al. | 48/202 |
| 4,160,725 | 7/1979 | Josis et al. | 210/21 |
| 4,217,211 | 8/1980 | Crane | 210/7 |
| 4,272,383 | 6/1981 | McGrew | 210/761 |
| 4,367,146 | 1/1983 | Pollock et al. | 210/608 |
| 4,541,986 | 9/1985 | Schwab et al. | 422/5 |
| 4,543,190 | 9/1985 | Modell | 210/721 |
| 4,564,458 | 1/1986 | Burleson | 210/747 |
| 4,671,351 | 6/1987 | Rappe | 165/133 |
| 4,676,908 | 6/1987 | Ciepiela et al. | 210/638 |
| 4,689,156 | 8/1987 | Zibrida | 210/747 |
| 4,721,575 | 1/1988 | Binning et al. | 210/761 |

(List continued on next page.)

FOREIGN PATENT DOCUMENTS

| | | |
|---|---|---|
| 0029536 | 6/1981 | European Pat. Off. . |
| 0228755 | 1/1992 | European Pat. Off. . |
| 560505A2 | 9/1993 | European Pat. Off. . |
| 3714591A1 | 11/1987 | Germany . |
| WO94/18128 | 8/1994 | WIPO . |

OTHER PUBLICATIONS

An Integrated Treatment Process For Acrylonitrile Production Wastewaters, Copa et al, prior to 1994 no month.

The Wet Air Oxidation (WAO) of Wastes, Othmer, Mechanical Engineeering, Del. 1979, pp. 30–37 no month.

Wet Air Oxidation of Sewage Sludge, Hurwitz et al, Water & Sewage Works, Aug. 1965 pp. 298–304.

Wet Air Oxidation, Teletzke, 60 Chem. Eng. Progress, Jan. 1964, pp. 33–38.

New Waste Disposal Process, Zimmermann, Chem. Eng., Aug. 1958, pp. 117–120.

*Primary Examiner*—Arun S. Phasge
*Attorney, Agent, or Firm*—Guy McClung

[57] ABSTRACT

The present invention, in certain embodiments, teaches a process for treating ammonia or ammonium-sulfate-containing waste effluent from an acrylonitrile, caprolactam or acetonitrile manufacturing facility. In one such process the effluent is fed to a deep well oxidizer, e.g. a water oxidizer vertical tube reactor (super critical or subcritical), to degrade organic contaminants. Certain embodiments of the deep well oxidizer have, according to this invention, an oxygen inlet tube movable by a coil tubing system. The output stream from the vertical tube reactor is, preferably, filtered, and then it is fed to an electrodialysis unit. In one aspect the electrodialysis unit produces an output stream at a pH of about 5 with a concentration of ammonium sulfate at least, preferably, of about 15% by weight, and most preferably between about 20% and about 26% by weight. This output stream may be neutralized and then further treated to remove ammonia and/or ammonium sulfate solids, e.g. by a downstream ammonia stripper, evaporator, and/or crystallizer system or combination thereof.

17 Claims, 1 Drawing Sheet

U.S. PATENT DOCUMENTS

| | | | |
|---|---|---|---|
| 4,744,908 | 5/1988 | Peterschenck et al. | 210/747 |
| 4,767,543 | 8/1988 | Chornet et al. | 210/759 |
| 4,774,006 | 9/1988 | Kaufmann | 210/742 |
| 4,778,490 | 10/1988 | Pollert | 55/53 |
| 4,869,321 | 9/1989 | Hamilton | 166/277 |
| 5,034,105 | 7/1991 | Berglund et al. | 204/182.4 |
| 5,117,909 | 6/1992 | Wilton et al. | 166/277 |
| 5,234,607 | 8/1993 | Brandenburg et al. | 210/761 |
| 5,236,557 | 8/1993 | Muller et al. | 203/10 |
| 5,240,619 | 8/1993 | Copa et al. | 210/752 |
| 5,250,193 | 10/1993 | Sawicki et al. | 210/761 |

PRODUCTION AND PURIFICATION OF CONTAMINATED EFFLUENT STREAMS CONTAINING AMMONIUM SULFATE AND AMMONIA

BACKGROUND OF THE INVENTION

1. Field of the Invention

This invention is directed to processes for treating effluent by-product streams containing ammonia and/or ammonium containing salts (e.g. ammonium sulfate) and undesirable by-products. In one aspect such processes are used to treat effluent by-product streams from acetonitrile, caprolactam, or acrylonitrile manufacturing processes. In one aspect of such processes a vertical tube reactor is used with an oxygen injector on a coil tubing system to remove undesirable organic contaminants from an effluent.

2. Description of Related Art

By-products generated during the manufacturing of acetonitrile or acrylonitrile are generally classified as Resource Conservation and Recovery Act (RCRA) hazardous materials. These by-products are listed as K011, K013, and K014 hazardous wastes, if they are discarded, and, as waste, are reportable under the Emergency Planning and Right-to-Know Act (EPRKA) of 1986.

K011 and K013 wastewaters include nearly all of the RCRA hazardous process waste that is generated from the manufacture of acrylonitrile. K011 wastewater is high strength and contains high concentrations of dissolved solids, primarily ammonium sulfate and significant concentrations of organic components that are difficult to treat by most conventional methods used in the chemical processing industry. K011 organic components foul heat exchanger surfaces when heated, and the wastewater is toxic to biological systems. K013 wastewater is typically lower strength, contains fewer dissolved solids, and exhibits less biological toxicity.

In one integrated prior art process K011 wastewater is pre-treated by wet oxidation to destroy the majority of the waste's organic components. The oxidation reduces the waste strength and destroys some of the components which inhibit biological treatment. The wet oxidation effluent is then processed through an evaporator/crystallizer system to remove ammonium sulfate. The ammonium sulfate is discharged from the system as crystalline product or concentration brine depending on the intended final use. Condensate from the evaporator/crystallizer is mixed with the K013 wastewater and the mixture treated in a biophysical PACT (TM) treatment system. The PACT treatment system, which combines carbon adsorption with biological assimilation, produces an effluent in an effort to satisfy RCRA or NPDES discharge requirements. The process attempts to generate low amounts of residuals for disposal and to reduce or eliminate the need for deep well disposal.

Other industrial processes also produce effluent waste streams that contain significant quantities of potentially recoverable ammonia or ammonium sulfate. One other such manufacturing process involves the production of caprolactam. Currently, these waste streams are considered to have no commercial value and are typically discarded in a manner similar to that described above for acrylonitrile production. The high volume at which all of these streams are generated (e.g. more than 300 gallons per minute) and the toxicity of the stream make treatment by conventional technologies untenable.

In certain prior art deep well oxidation units, oxygen is introduced through an oxygen inlet tube into a high temperature and pressure region of a deep well reactor. Over time (in some cases in only several hours) these tubes become corroded and oxidized and they are eventually replaced.

In certain other prior art deep well oxidation units, the oxygen inlet tube is fixed at a predetermined depth within the reactor, permitting no adjustability of tube depth and inhibiting control of the reaction zone in the reactor. Also, having a fixed tube limits the ability to modify the oxidizing zone as the composition of the stream to be processed changes and, therefore, limits the destruction efficiency of organic chemicals in the stream.

As a reactor of a deep well oxidation unit ages, so also does a downcomer tube used in such reactors, due to corrosion and resulting in a shortening in length. As the reactor ages scale and sludge accumulate in the bottom of the reactor, resulting in undesirable narrowing of the clearance between the bottom of the reactor and the oxygen inlet tube.

SUMMARY OF THE PRESENT INVENTION

The present invention, in certain embodiments, teaches a process for treating ammonium-sulfate-containing effluent from an acrylonitrile or acetonitrile manufacturing facility. In one such process the effluent is fed to a deep well oxidizer, e.g. a subcritical water oxidizer vertical tube reactor to degrade organic contaminants. Typically such an effluent is a solution with up to about 10% by weight ammonium sulfate, about ½ to 5% by weight undesirable chemicals (e.g. acrylic acid, acrylamide, maleimide, maleonitrile, fumaronitrile, caprolactam) and the remainder water. The stream may also contain cyanide. Certain vertical tube reactors produce an effluent in which undesirable organic chemicals have been converted to less noxious or innocuous compounds such as carbon dioxide, water and low molecular weight organic acids. Such effluent is about 4% by weight ammonium sulfate and about 96% by weight water. Such effluents are, preferably, filtered, e.g. with any conventional filtration system to filter out sand and other debris, and then it is fed to a conventional commercially available electrodialysis unit such as a TS-100-600 model from Tokuyama America, Inc.

The electrodialysis unit ("EDU") produces an output stream with a concentration of ammonium sulfate at least, preferably, of about 15% by weight, and most preferably between about 20% and about 26% by weight ammonium sulfate in solution. This output stream may then be further treated to remove ammonia and/or ammonium sulfate solids, e.g. by a downstream ammonia stripper, evaporator/crystallizer system, or both.

In one aspect in which a downstream ammonia stripper tower is employed, an output ammonia vapor stream from the top of the tower is fed to a condenser to produce an output stream that is about 99% ammonia by weight (remainder water) and a residual stream (which is typically less than one percent ammonia, plus water) which is refluxed back to the stripper tower for further treatment. A typical steam reboiler provides heat to the stripping tower.

The EDU uses a typical anode tank (e.g. with sodium sulfate solution) and a typical rectifier to impose a current across the EDU. The EDU also produces a dilute residual salt stream with organic acids and about 0.6% by weight ammonium sulfate which can be disposed of, e.g. in a deep well disposal system.

The relatively concentrated output from the EDU is, preferably, pH adjusted to a pH of about 10 in a neutralizer by adding a basic material, e.g. magnesium oxide, calcium oxide, calcium hydroxide, or sodium hydroxide to raise the pH.

By-products, remaining acetic acid, and sulfates are discharged from the stripping tower for disposal, e.g. in a deep well disposal system. Typically such a stream may also contain about 1% by weight ammonium sulfate.

In another aspect of a process according to the present invention, the concentrated EDU output is fed to an evaporator and then to a crystallizer to recover ammonium sulfate solids.

In another aspect of such a process, residual heat that exists in the effluent stream after it exits the vertical tube reactor is used to evaporate substantial amounts of water from the stream. The more concentrated and now cooled stream is then processed through the EDU for further concentrating before recovering crystalline ammonium sulfate via a standard crystallization procedure.

In another aspect of such a process according to the present invention, concentrated output from the EDU is fed to an evaporator and then to a crystallizer to recover ammonium sulfate solids.

In one aspect of the present invention organic contaminants in the effluent stream are rendered less noxious or innocuous in a vertical tube deep well reactor with a movable oxygen inlet tube.

It is, therefore, an object of at least certain preferred embodiments of the present invention to provide:

New, useful, unique, efficient, nonobvious processes for removing ammonia and/or ammonium sulfate from acetonitrile or acrylonitrile manufacturing process waste effluent streams;

Such processes which produce recoverable re-usable ammonia and/or ammonia-containing compounds and/or ammonium sulfate;

Such processes which produce by-product streams which may be disposed of, e.g. in deep well disposal systems;

Such processes which reduce the amount of toxic chemicals discharged to the environment; and New, useful, unique, efficient, and nonobvious deep well, subcritical or supercritical water oxidation units which, in certain aspects, have prolonged operational life, conserve energy, and have reduced maintenance costs; and in one aspect have a movable oxygen inlet tube which, in certain embodiments, has a ceramic tip.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
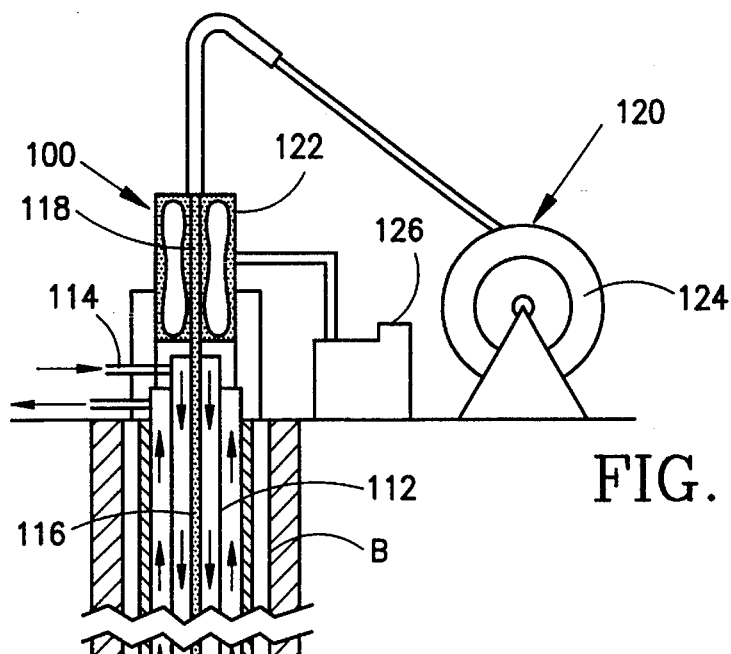
FIG. 1 is a schematic of a deep well oxidation unit according to the present invention.

FIG. 1 illustrates a well oxidation unit 100 according to the present invention. A vertical deep well reactor 110 with a vertical chamber 112 is disposed in a bore B, e.g. a wellbore in the earth. An effluent stream to be treated (e.g. any of the effluent streams discussed above) flows through a feed input 114 into the vertical chamber 112. Oxygen is fed into the vertical chamber 112 through a hollow movable oxygen inlet tube 116 which has a longitudinal oxygen flow channel therethrough and which is connected to coil tubing 118 of a coil tubing system 120. In certain preferred embodiments the oxygen inlet tube has a ceramic tip 117.

The coil tubing system 120 is like any typical commercially available coil tubing system and has a tubing injector device 122 which moves the coil tubing (and hence the oxygen inlet tube) up and down in the vertical chamber 112. The coil tubing is stored on a reel unit 124 and power is supplied to the injector device 122 by a power system 126. It is within the scope of this invention to move the oxygen inlet tube by any suitable means including, but not limited to, a coil tubing system.

A hollow ceramic tip for an oxygen inlet tube according to certain preferred embodiments of this invention may range in length between two inches and thirty feet. The use of such tips reduces tube corrosion at the tip, reduces maintenance costs and prolongs tube life. The introduction of oxygen into a high temperature and pressure region of the deep well reactor results in the formation of a highly oxidizing environment starting at the tip of the oxygen inlet tube. This highly oxidizing environment causes the oxygen inlet tube to become corroded and oxidized away in such a manner that it causes the tube to become shorter with time, eventually requiring tube replacement. The rapidity with which this occurs is dependent upon the temperature and pressure in the oxidizing environment. Under conditions of very high temperature and pressure, this oxidation and shortening of the tube can occur in a matter of a few hours.

Having an adjustable inlet tube allows finer control of the reaction zone in the reactor. Shortening the tube increases the length of the oxidizing zone in the reactor. Lengthening the tube decreases the length of the reaction zone. As the composition of the stream processed by the deep well reactor is seldom constant, the ability to modify the oxidizing zone in the reactor is a method to compensate for and optimize the destruction efficiency of the organic chemicals present in the stream.

As a reactor ages, the downcomer tube may also experience corrosion and shortening of length. An adjustable inlet tube allows compensation for this shortening without the need to shut down the reactor and replace the downcomer tube. Scale and sludge accumulate both in the bottom of the reactor and on the sides of the downcomer tube. These accumulations may restrict flow of both oxygen and fluids through the reaction zone. Moving the adjustable oxygen inlet tube allows for continued operation of the reactor without the need to clean the reactor as often as with prior systems.

In certain embodiments a coiled tubing unit is used to effect the positioning and movement of the oxygen inlet tube. Use of a coiled tubing unit permits modification of the length of oxygen inlet tube with a minimum amount of reactor downtime. In certain embodiments, e.g. when other than cryogenic fluids are being used as oxidants in a deep well reactor, the tube length is adjusted with no interruption in reactor operation.

Figure 2:
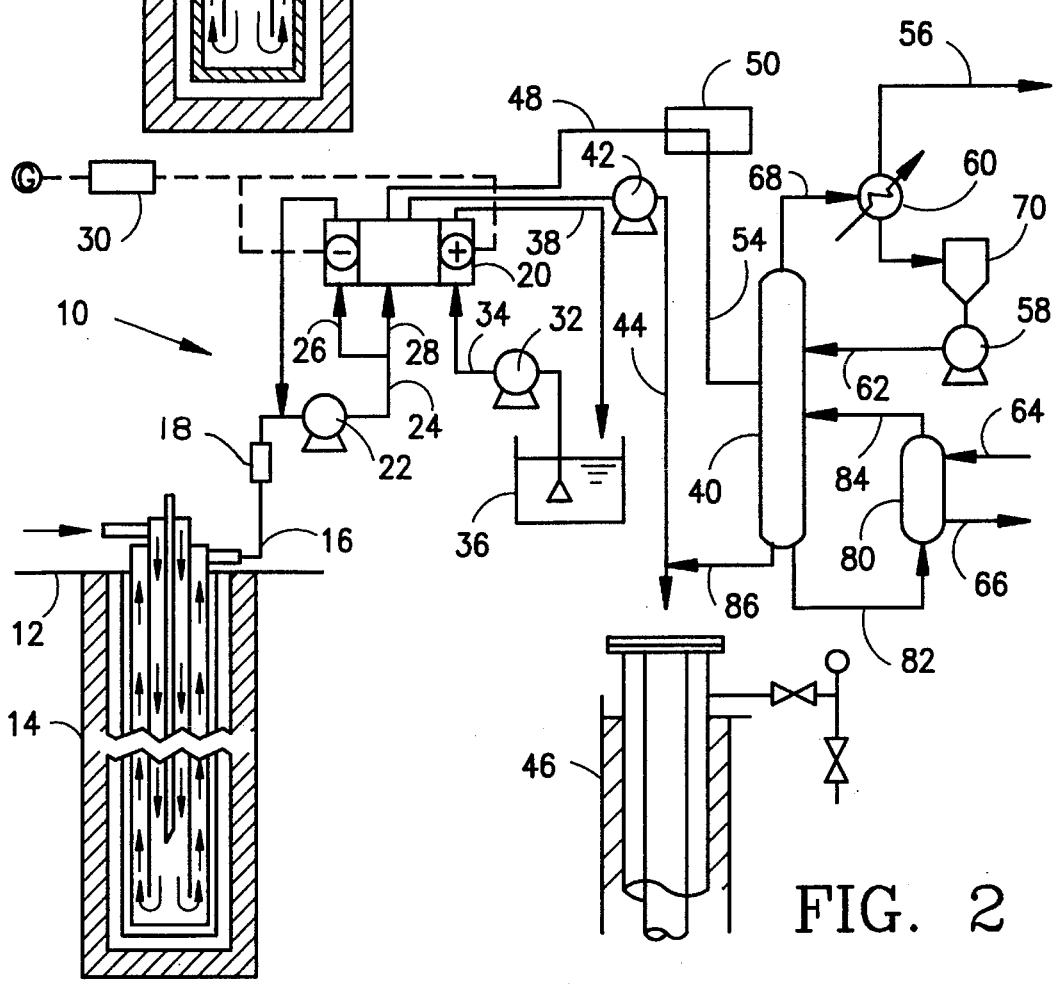
FIG. 2 is a schematic view illustrating a process according to the present invention.

Referring now to FIG. 2, in a process 10 according to the present invention a waste effluent stream 12 from an acrylonitrile manufacturing process is fed to a deep well subcritical water oxidizer vertical tube reactor 14 (or to some other system for degrading organics in the stream 12). Typically the stream 12 is about 4% ammonium sulfate in solution; about 1½ organics; and about 94½% water by weight. Oxygen-containing fluid (e.g. compressed air, liquid oxygen, or some other oxidizing agent, e.g. hydrogen peroxide) is fed to the reactor to further degrade organics in the stream 12.

An output stream 16 from the reactor 14 is filtered through a filter 18 and pumped by a pump 22 through lines 24, 26, 28 to an electrodialysis unit ("EDU") 20. A rectifier 30 imposes a current across the EDU 20 (shown by the dotted line in FIG. 2) and an anodic solution, e.g. sodium sulfate, is pumped by a pump 32 in a line 34 from an anode solution tank 36 to the EDU, preferably continuously as needed. Spent anodic solution is returned to the tank 36 in a line 38.

A dilute stream, e.g. with about 0.6% by weight ammonium sulfate produced in the EDU is pumped by a pump 42 in a line 44 to a deep well disposal system 46. An output stream 48 is pumped by the pump 22 to a neutralizing system 50. Such an output stream is preferably at an ammonium sulfate level of at least about 15% by weight and most preferably at about 20% to 26% by weight. An output stream 48 at pH of about 5 is pH adjusted to enhance downstream ammonia removal, e.g. with liquid or solid magnesium oxide, sodium hydroxide or calcium hydroxide or other caustic substances, to a pH of about 10 or more in the neutralizing system 50, preferably in a tank with an agitator. If there is excess water in the system, solid pH adjusting chemicals are preferred.

In a line 54, the stream is then pumped to a stripper column 40, e.g. a conventional ammonia stripping tower.

The column 40 produces an ammonia vapor stream which exits from the top of the tower 40 and flows in a line 68 to a condenser 60. The condenser 60, (e.g. a conventional ammonia condenser) produces a stream of liquid ammonia, preferably 90% ammonia liquid by weight, and most preferably 99% or more, (the remainder water) which is pumped into an exit line 56. Residual material produced by the condenser 60 is fed to a collection tank 70 and pumped by a pump 58 back to the column 40 in a line 62 for further treatment. The residual material stream contains about less than 1% ammonia by weight, the remainder water.

A reboiler 80 (e.g. a conventional steam reboiler with steam input in a line 64 and vapor condensate output in a line 66) supplies heat via lines 82 and 84 for the column 40.

Column by-products (e.g. some ammonium sulfate, water, remaining acetic acid, and sulfates) are fed to the disposal system 46 in a line 86.

In one embodiment according to the present invention, a process for treating an effluent waste stream containing dissolved ammonium salts at a first concentration and organic contaminants includes flowing the effluent waste stream to an electrodialysis unit; producing with the electrodialysis unit a stream containing ammonium salt in solution at a higher concentration than that of the first concentration of the effluent; flowing the ammonium salt containing stream from the electrodialysis unit to an evaporator; and producing an output stream in the evaporator with a higher concentration of ammonium salt than the stream containing ammonium salt from the electrodialysis unit. Such a process may also include flowing the output stream from the evaporator to a crystallization unit; producing solid ammonium salts in the crystallizing unit; and flowing the solid ammonium salts from the crystallizing unit.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. A process for treating a first aqueous effluent waste stream, the first effluent waste stream containing dissolved ammonium salts at a first concentration and organic contaminants, the process comprising flowing the first effluent waste stream to a deep well oxidizer for oxidation therein to degrade organic contaminants in the first effluent waste stream producing a second effluent waste stream, flowing the second effluent waste stream to an electrodialysis unit, and producing with the electrodialysis unit a third stream containing ammonium salt in solution at a second concentration higher than that of the first concentration of ammonium salts of the first effluent waste stream.

2. The process of claim 1 wherein the deep well oxidizer has a movable oxygen inlet tube disposed therein, the process further comprising moving the oxygen inlet tube in the deep well oxidizer to enhance oxidation of the first effluent waste stream.

3. The process of claim 2 further comprising connecting the oxygen inlet tube to a coil tubing unit having coil tubing removably disposed thereon, and moving the oxygen inlet tube in the deep well oxidizer by moving the coil tubing on the coil tubing unit.

4. The process of claim 2 wherein the oxygen inlet tube has a lower ceramic portion and the process further comprising flowing oxygen out from the lower ceramic portion of the oxygen inlet tube.

5. The process of claim 1 wherein the second effluent waste stream is by weight about 4% ammonium sulfate and about 96% water.

6. The process of claim 1 wherein the deep well oxidizer is a subcritical vertical tube reactor.

7. The process of claim 1 wherein the first effluent stream is by weight about 10% ammonium sulfate, about 0.5 to 5% contaminants, and the remainder water.

8. The process of claim 7 wherein the contaminants are from the group comprising acrylic acid, acrylamide, maleimide, maleonitrile, fumaronitrile, caprolactam, and cyanide salts.

9. The process of claim 1 wherein the second concentration is at least 15% by weight.

10. The process of claim 9 wherein the second concentration is between about 20% to about 26% by weight.

11. The process of claim 1 further comprising feeding the third stream containing ammonium salt in solution to a stripper tower, producing in the stripper tower a stream of liquid ammonia, and flowing the stream of liquid ammonia from the tripper tower.

12. The process of claim 1 further comprising feeding the third stream containing ammonium salt in solution to a pH adjusting system to raise its pH.

13. The process of claim 2 wherein the pH is raised to at least 10 to facilitate recovery of ammonia in a stripper tower.

14. The process of claim 1 further comprising flowing the third stream from the electrodialysis unit to an evaporator, and producing an output stream in the evaporator with a higher concentration of ammonium salt than the third stream containing ammonium salt from the electrodialysis unit.

15. The process of claim 14 further comprising flowing the output stream from the evaporator to a crystallization unit, producing solid ammonium salts in the crystallizing unit, and flowing the solid ammonium salts from the crystallizing unit.

16. The process of claim 1 further comprising flowing the third stream from the electrodialysis unit to a crystallization unit, producing solid ammonium salts in the crystallizing unit, and flowing the solid ammonium salts from the crystallizing unit.

17. A process for treating a first effluent waste stream from an acrylonitrile or acetonitrile manufacturing process, the first effluent waste stream being an aqueous stream and containing dissolved ammonium salts at a first concentration and organic contaminants, the first effluent stream is by weight about 10% ammonium sulfate, about 0.5 to 5% contaminants, and the remainder water, the second effluent waste stream is by weight about 4% ammonium sulfate and about 96% water, the process comprising flowing the first effluent waste stream to a deep well oxidizer for oxidation therein to degrade organic contaminants producing a second effluent waste stream, the deep well oxidizer having a movable oxygen inlet tube disposed therein, connecting the oxygen inlet tube to a coil tubing unit having coil tubing removably disposed thereon, and moving the oxygen inlet tube in the deep well oxidizer by moving the coil tubing on the coil tubing unit, moving the oxygen inlet tube in the deep well oxidizer to enhance oxidation of the first effluent waste stream, flowing the second effluent waste stream to an electrodialysis unit, producing with the electrodialysis unit a third stream containing ammonium salt in solution at a second concentration higher than that of the first concentration of ammonium salts of the first effluent waste stream, feeding the third stream containing ammonium salt in solution to a pH adjusting system to raise its pH, to at least 10 to facilitate recovery of ammonia in a stripper tower, feeding the third stream containing ammonium salt in solution to a stripper tower, producing in the stripper tower a stream of liquid ammonia, and flowing the stream of liquid ammonia from the stripper tower.

* * * * *